Nov. 6, 1934.　　　H. A. NELSON　　　1,979,401

SCOOP BOARD FOR VEHICLE BOXES

Filed June 26, 1933

INVENTOR.
H. A. NELSON
BY M. Talbert Dick
ATTORNEY.

Patented Nov. 6, 1934

1,979,401

UNITED STATES PATENT OFFICE 1,979,401

SCOOP BOARD FOR VEHICLE BOXES

Hans A. Nelson, Exira, Iowa

Application June 26, 1933, Serial No. 677,658

1 Claim. (Cl. 280—58)

The principal object of my invention is to provide a combination detachable scoop board and end gate for vehicle boxes, such as wagon and truck boxes, that is economical in manufacture and durable in use.

A further object of this invention is to provide a scoop board that may be easily and quickly placed from an open position to a closed position or from a closed position to an open position.

A still further object of my invention is to provide a scoop board for vehicle boxes that may be easily installed on a vehicle without the use of special tools or the services of a skilled workman.

A still further object of this invention is to provide a scoop board for vehicle boxes that is so designed that the scoop portion may be easily removed or replaced on the vehicle.

A still further object of this invention is to provide an end gate or like for a vehicle box that aids in preventing rear end collisions at night.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

Figure 1:
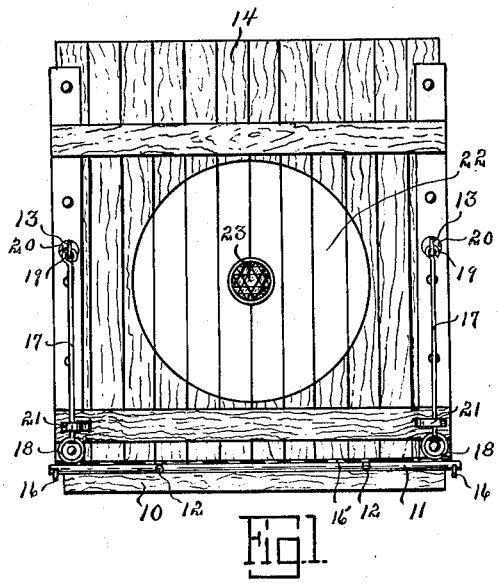
Fig. 1 is a rear end view of my device installed on a vehicle box and in a closed position to form an end gate for the vehicle to which it is attached.

Referring to the drawing I have used the numeral 10 to designate a vehicle box open at its rear end. It is upon such a vehicle box that I install my device and which I will now describe.

The numeral 11 designates a horizontal rod rigidly secured to the rear bottom of the vehicle box by suitable means such as bolts or screws 12. The numeral 13 designates an ear member secured by suitable means to each of the side walls of the vehicle box. These two ears 13 and the rod 11 protrude beyond the rear end of the vehicle box, as shown in the drawing, and are of a permanent nature after having been installed.

Figure 2:
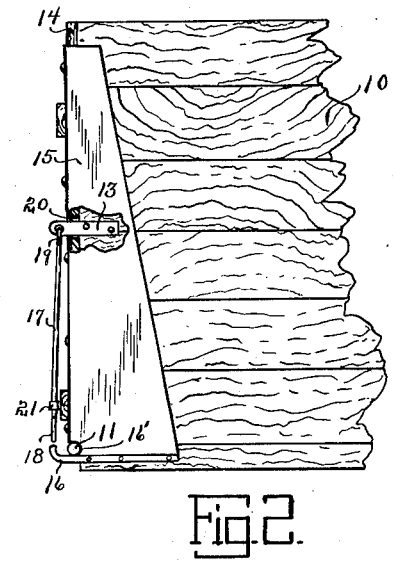
Fig. 2 is a side view of my scoop board and end gate installed on a vehicle box with sections cut away to more fully illustrate its construction.
Figure 4:
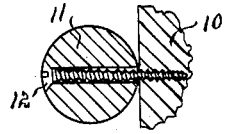
Fig. 4 is a cross-sectional view of a rod permanently installed on the box using my device.
Figure 3:
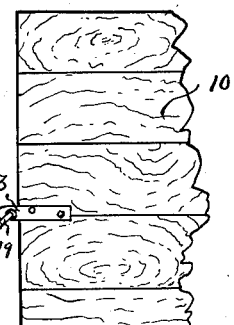
Fig. 3 is a side view of my device secured to a vehicle box and in an open position.
Figure 5:
Fig. 5 is an enlarged side view of the upper end portion of one of the side rods.
Figure 6:
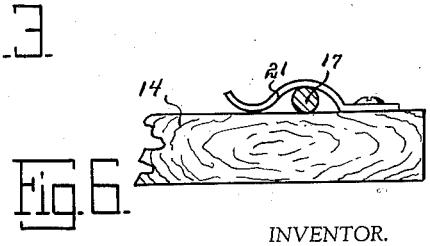
Fig. 6 is a bottom view of one of the spring clips for yieldingly holding a side rod in a given position when the device is being used as an end gate.
Figure 7:
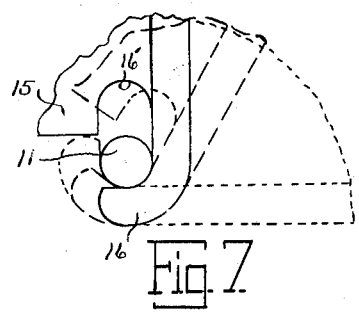
Fig. 7 is a side view of one of the hook bars showing in dotted lines its various positions during the possible swinging moments of the scoop portion.

The detachable scoop portion of the device may be of any suitable material and design. In the drawing I show the bottom of the scoop portion made of wood, which I have designated by the numeral 14 and the sides of the scoop made of suitable metal designated by the numeral 15. The scoop portion may be of any suitable length, but it is recommended that it be sufficient to provide a substantial end gate or closing member for the vehicle box when the scoop portion is placed in a closed position as shown in Fig. 2. The height of the side walls of the scoop portion may decrease in height as they extend from the bottom of the vehicle box, as shown in Fig. 3. From this it will be seen that the length and height of the scoop are not of definite importance, but the width of the scoop portion must be such that when the device is secured to the vehicle box the two side walls 15 of the scoop portion will extend to the sides of the vehicle box respectively when the scoop portion is in a closed position, as shown in Fig. 1 and Fig. 2. The numeral 16 designates a hook member secured to the rear portion of each of the side members 15 of the scoop portion. These two hook members are designed to hook around the scoop supporting rod 11, as shown in Fig. 3, and when the scoop portion is in an open position they extend to a point just past the center line of the rod 11. This construction of the device is very important and must be manufactured very accurately in order that the device will not become accidentally detached when in a normal position, as shown in Fig. 3, but may easily and quickly be attached or detached when the bottom of the scoop portion is slightly past a horizontal position.

The numeral 16' designates a notch in the rear bottom of each of the sides 15 of the scoop. These notches are positioned in a direct line to the rear of the hook members 16 in order that when the scoop is placed in a closed position as shown in Fig. 2, the rod 11 will enter the notches and the rear bottom end of the scoop resting on the rod, thereby aiding in supporting the scoop. These notches with the hooks 16 provide sufficient room for the rod 11 and also permit the scoop to be easily detached from the box 10. The numeral 17 designates two side rods, each having an enlarged end or loop 18 formed on their bottom ends. These two side rods are detachably secured at their upper ends to the two ear members 13 respectively by open eye hooks 19 formed on their upper ends and engaging small holes in the outer ends of each of the ears 13, as shown in Fig. 1.

The numeral 20 designates two holes in the bottom of the scoop portion. When the scoop portion is in a closed position, as shown in Fig. 2, the two ear members 13 extend substantially through the holes 20 respectively. If the side rods 17 are hooked into the ears 13 and extend directly downwardly on the outside of the bottom of the scoop member as shown in Fig. 2, the scoop member will thereby be rigidly held in a closed position and will act as an end gate to the vehicle box. In order to hold the side rods 17 in such a downwardly position, as shown in Fig. 1, I have provided two spring clips 21 on the bottom of the scoop member. To rigidly secure the scoop member in a closed position it is merely necessary to force the side rods 17 under the spring clip members 21, which engages the side rods near their bottom ends.

To lower the device to an open position for use as a scoop board it is merely necessary to remove the side rods 17 from the spring clips 21 which yieldingly hold them in a downward vertical position and swing the top of the scoop member outwardly and downwardly from the vehicle box, allowing the side rods 17 to thread through the holes 20 respectively in the bottom of the scoop member. The scoop member will swing outwardly and downwardly until the enlarged ends 18 of the side rods are engaged; the enlarged ends 18 being of greater diameters than the diameters of the holes 20 in the bottom of the scoop portion. The lengths of the side rods 17 and the positions of the holes 20 should be such that when the enlarged ends 18 are engaged by the scoop portion, the scoop portion will be in a position as shown in Fig. 3 with its outer bottom end slightly above its inner bottom end. With the scoop in this position the hook members 16 will extend slightly beyond a vertical line drawn directly through the center of the rod 11, thereby preventing the upward movement of the rear end of the scoop member when weight is placed on the outer end of the scoop portion. With weight put on the front end portion of the scoop, the rear end of the scoop will swing upwardly and rearwardly until the hooks engage the rod 11. This will bring the rear bottom of the scoop flush with the bottom of the box 10.

To close the scoop portion the outer end is swung upwardly and toward the vehicle box and the side rods secured, as herebefore explained. To detach the scoop portion from the vehicle box the side rods are unhooked from the ears 13, thereby permitting the scoop portion to be swung to or past a horizontal position. With the scoop portion in this position the ends of the hook members 16 will be back of the vertical line drawn directly through the center of the supporting rod 11 and the rear end portion of the scoop can be raised upwardly to detach the hook members 16 from the supporting rod 11.

From the foregoing it will readily be seen that with my construction of scoop board and means of attaching the same to a vehicle box, the scoop may be easily attached to or detached from the vehicle box or quickly moved to a rigid open or a rigid closed position.

No doubt my device will be used mostly on horse drawn vehicles such as wagons. Such vehicles do not have available electric current and to prevent accidents from faster vehicles running into the horse drawn vehicle at night I have provided an easily seen reflecting device on the bottom of the scoop portion, as shown in Fig. 1. This reflecting device should be of substantial dimension and to this end I have painted a large bull's eye 22 on the bottom of the scoop board, as shown in Fig. 1. This large bull's eye may be of silver, white, or yellow color. In the center of this bull's eye I have mounted an ordinary red glass reflecting element having a silver reflecting finish on its inner side. This glass reflector is designated by the numeral 23. When a faster vehicle approaches from the rear its lights will contact the bull's eye 22 and reflector 23 and warn the operator of the faster vehicle of the presence of a slower vehicle ahead of him.

Some changes may be made in the construction and arrangement of my improved scoop board for vehicle boxes without departing from the real spirit and purpose of my invention, and it is my intention to cover by my claim any modified forms of structure or use of mechanical equivalents which may be reasonably included within their scope.

I claim:

In combination with a vehicle box, a horizontal supporting rod secured to the rear lower end portion of said box, a scoop board element, hook members secured to said scoop board element capable of engaging said supporting rod at times, notches in the bottom of said scoop member at a suitable distance from and facing said hook members capable of engaging said rod at times, and a side supporting element having one end secured to said box and its other end secured to said scoop board element for supporting said scoop board element in an open position.

HANS A. NELSON.